UNITED STATES PATENT OFFICE

LUDWIG ZEH, OF WIESDORF-ON-THE-RHINE, ERWIN KRAMER, OF COLOGNE-DEUTZ, AND BERNHARD BOLLWEG, OF LEVERKUSEN-ON-THE-RHINE, GERMANY, ASSIGNORS TO GENERAL ANILINE WORKS, INC., OF NEW YORK, N. Y., A CORPORATION OF DELAWARE

NITRO COMPOUNDS OF DINAPHTHYLENE-DIOXIDES

No Drawing. Application filed June 28, 1928, Serial No. 289,077, and in Germany July 25, 1927.

The present invention relates to a process of nitrating dinaphthylene dioxides and to new products obtainable thereby. It is to be understood that the term "dinaphthylene dioxides" is intended to include dinaphthylene dioxide and substitution products thereof, such as, for example, halogen dinaphthylene dioxides, dinaphthylene dioxide sulfonic- and carboxylic acids and esters of the latter and the like.

The nitration of dinaphthylene dioxide with highly concentrated nitric acid yields the tetranitro compound of Bünzley and Decker (Ber. 38, 3271) and the hexanitro compounds in accordance with the process of the British Patent No. 253,368. The manufacture of lower nitrated compounds is, however, not possible by these processes. To produce the same in the customary manner by nitration in concentrated sulfuric acid leads to failure, since simultaneously with the nitration there occurs a far reaching change of the naphthylene dioxide by oxidation and sulfonation, whilst the use of dilute nitric acid or of a mixture of acetic and nitric acids yields a mixture of substances of varying degrees of nitration.

In accordance with the present invention the manufacture of homogeneous nitro compounds of dinaphthylene dioxide, containing less than 4 nitrogen atoms is readily achieved with an almost quantitative yield by acting upon dinaphthylene dioxides with nitric acid formed in situ in the presence of a suitable diluent. This can be effected, for example, by producing a paste of the dinaphthylene dioxides in acetic acid with a salt of nitric acid, such as potassium nitrate, and causing sulfuric acid at the ordinary temperature or at an elevated temperature to run into the suspension at the rate at which the nitric acid set free is consumed in the nitration.

The new homogeneous nitro compounds are generally solid products soluble in concentrated sulfuric acid with a reddish to blue coloration, crystallizing from organic solvents in well formed crystals.

The following example will illustrate our invention, without being limited thereto:

*Example.*—282 parts by weight of dinaphthalene dioxide are made into a paste with 3000 parts by weight of glacial acetic acid and a concentrated aqueous solution of 101 parts by weight of potassium nitrate added thereto. 50 parts by weight of sulfuric acid of 30-40% strength are then run in the course of 1-2 hours. The nitration is begun at the ordinary temperature and the temperature is raised in the course of the reaction to 70-80° C. Nitration can likewise be carried out at 100° C. or in boiling acetic acid. The mononitrodinaphthylene dioxide, consisting of homogeneous violet small needles, is washed with water until neutral. It dissolves in concentrated sulfuric acid with a blue coloration, in organic solvents, such as chlorobenzene or pyridine, with a bluish red coloration and crystallizes in small needles, melting at 257° C. (uncorr.). It probably corresponds to the formula:

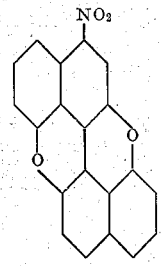

If instead of the above mentioned quantities of potassium nitrate and sulfuric acid double quantities are used a dinitro dinaphthylene dioxide corresponding to the probable formula:

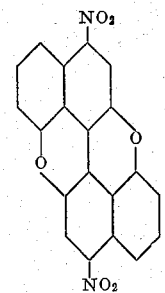

crystallizing in brownish red needles and melting at above 300° C. is obtained in very good yield. It dissolves with a violet coloration in concentrated sulfuric acid and can be recrystallized from organic solvents, such as chlorobenzene, nitrobenzene and pyridine.

We claim:

1. In the process for the manufacture of nitro compounds of dinaphthylene dioxides, the step which comprises causing nitric acid formed in situ to act on dinaphthylene dioxides.

2. Nitrodinaphthylene dioxides containing less than 4 nitrogroups, being generally solid products soluble in concentrated sulfuric acid with a reddish to blue coloration crystallizing from organic solvents in well formed needles.

3. Process which comprises causing sulfuric acid to run into a mixture of dinaphthylene dioxide with an alkali metal nitrate and acetic acid at a temperature of about 70–80° C.

4. The products of the probable general formula:

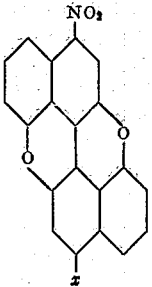

wherein $x$ stands for hydrogen or the nitrogroup, said products forming well crystallized needles soluble in concentrated sulfuric acid with a bluish-red to violet coloration.

In testimony whereof we have hereunto set our hands.

LUDWIG ZEH. [L. S.]
ERWIN KRAMER. [L. S.]
BERNHARD BOLLWEG. [L. S.]